United States Patent
Fünfschilling et al.

(10) Patent No.: US 6,597,422 B1
(45) Date of Patent: Jul. 22, 2003

(54) ORIENTATION LAYER FOR A LIQUID CRYSTAL MATERIAL

(75) Inventors: Jürg Fünfschilling, Basel (CH); Martin Stalder, Oberwil (CH); Martin Schadt, Seltisberg (CH)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/868,035
(22) PCT Filed: Dec. 6, 1999
(86) PCT No.: PCT/IB99/01938
§ 371 (c)(1), (2), (4) Date: Jun. 14, 2001
(87) PCT Pub. No.: WO00/36463
PCT Pub. Date: Jun. 22, 2000

(30) Foreign Application Priority Data

Dec. 15, 1998 (GB) .............................................. 9827540
Dec. 22, 1998 (GB) .............................................. 9828283

(51) Int. Cl.[7] ............................................. G02F 1/1335
(52) U.S. Cl. ......................... 349/123; 349/124; 428/1
(58) Field of Search ................. 349/123, 124; 428/1.2, 1.23, 1.26, 603

(56) References Cited

U.S. PATENT DOCUMENTS

| | | | | |
|---|---|---|---|---|
| 5,644,016 A | * | 7/1997 | Roschert et al. | 528/170 |
| 6,061,113 A | * | 5/2000 | Kawata | 349/117 |
| 6,215,539 B1 | | 4/2001 | Schadt et al. | |
| 6,362,863 B1 | * | 3/2002 | Kataoka et al. | 349/123 |

FOREIGN PATENT DOCUMENTS

EP 0 756 193 A1 1/1997

OTHER PUBLICATIONS

M. Schadt et al., *Photo–Generation of Linearly Polymerized Liquid Crystal Aligning Layers Comprising Novel, Integrated Optically Patterned Retarders and Color Filters*, Jpn. J. Appl. Phys. vol. 34 (1995) pp. 3240–3249.

* cited by examiner

Primary Examiner—Carl Whitehead, Jr.
Assistant Examiner—Thanh Nguyen
(74) Attorney, Agent, or Firm—Finnegan, Henderson, Farabow, Garrett & Dunner, LLP

(57) ABSTRACT

A liquid crystal device comprising ferroelectric liquid crystal material aligned by a liquid crystal polymer (LCP) network layer (18) under 20 nm thick, which itself was aligned by a photo-oriented linearly photopolymerized (LPP) layer (16) under 20 nm thick, exhibits low voltage drop over the aligning layer and has a remarkable contrast ratio.

14 Claims, 1 Drawing Sheet

ORIENTATION LAYER FOR A LIQUID CRYSTAL MATERIAL

Figure 1:
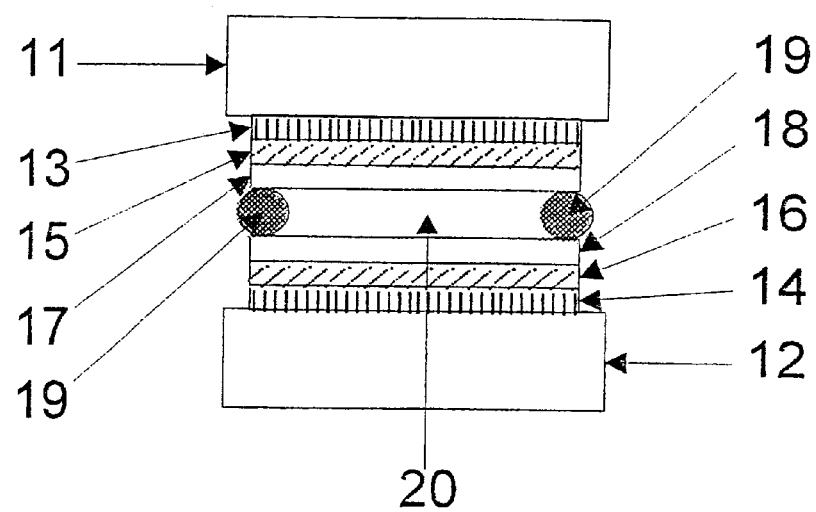

This application is a national stage filing of International Application No. PCT/IB99/01938, filed Dec. 6, 1999, which published in the English language. This application also claims the benefit of priority under 35 U.S.C. §119(a) to GB Application No. 9827540.7, filed on Dec. 15, 1998 and GB Application No. 9828283.3, filed on Dec. 22, 1998.

The invention relates to an orientation layer for a liquid crystal material.

Liquid crystal (LC) devices normally comprise a thin cell containing a liquid crystal material, the upper and lower inside faces of the cell carrying (usually transparent) orientation layers. These innermost layers are imparting a preferred orientation to liquid crystal molecules in their vicinity by defining the actual arrangement of the liquid crystal director close to the boundary. This preferred orientation tends to persist even away from the orientation layers due to the strong interaction of the liquid crystal molecules.

In nematic liquid crystals, the boundary can be characterised by the direction of the director (azimuth and tilt) the orientating layer induces in the liquid crystal, together with a parameter—the anchoring energy—that describes the strength of this anchoring, i.e. the change of the orientation if elastic deformations apply a torque to the boundary layers.

In ferroelectric liquid crystal displays (LCD)—which are based on chiral smectic-C liquid crystals—things are more complicated, since the orientation of the smectic layers as well as the orientation of the director inside the layers have to be defined. Furthermore, the quality of the liquid crystal alignment also depends to a large degree on the liquid crystal material used. Therefore, numerous combinations of orienting layers and liquid crystal materials have been proposed.

The existence of an orientation layer can bring difficulties:

In liquid crystal displays with large spontaneous polarisation $P_S$ such as Deformed Helix Ferroelectric (DHF) or Short-pitch Bistable Ferroelectric (SBF) or antiferroelectric liquid crystal displays, the voltage drop over the isolating orientation layer is large for a large thickness $d_{OR}$ of the orientation layer. This voltage drop is approximately given by $$U_{OR} = \frac{P_S d_{OR}}{\varepsilon \varepsilon_0}$$

where $\varepsilon$ is the dielectric constant of the orienting layer and $\varepsilon_0$ is the permittivity of vacuum. Taking $P_S=1$ mC/m$^2$, $d_{OR}=100$ nm, $\varepsilon=3$ results in $U_{OR}=3.8$ V per orienting layer.

Similar considerations hold for electroclinic liquid crystal displays (cf. e.g. S. Garroff and R. B. Meyer, Phys. Rev. Lett., 38, 848–851, 1977).

In liquid crystal displays with lower $P_S$, such as Alternating Polarisation Domain (APD) or Surface Stabilised Ferroelectric (SSF) liquid crystal displays, this voltage drop is smaller, but still undesirable.

In addition, SSF liquid crystal displays require thin orientation layers to avoid the build-up of polarisation charges which lead to ghost pictures in SSF liquid crystal displays.

Thus, one condition is important, namely, the orientation layer must be thin.

As a consequence, also orientation layers for SSF liquid crystal displays are thin, sometimes even monomolecular (e.g. Langmuir-Blodgett films).

The standard procedure to prepare orienting layers consists of coating the substrates with a thin polymer layer and subsequent rubbing of the layer to induce the desired orientation direction. This rubbing process has undesirable side-effects such as giving rise to dust particles, which are particularly damaging in the production of small-cell-gap (below 2 µm) liquid crystal displays, thus including most ferroelectric liquid crystal displays.

EP 756 193 describes a technique to align liquid crystals with a two-layer process:

A first layer of a linearly photopolymerisable material is coated onto the substrate and exposed to polarised light. This light induces crosslinking reactions in the layer, and because polarised light is used, this crosslinking induces an anisotropy in the layer. Such layers are called linearly photopolymerised polymer (LPP) layers, also known as photo-oriented polymer networks (PPN).

A second layer of nematic monomers or prepolymers is then applied. This nematic liquid crystal is oriented by the LPP layer, i.e. the anisotropy in the LPP layer is transferred to the nematic liquid crystal layer. This oriented nematic prepolymer layer is then photopolymerised and thus permanently fixed as a highly anisotropic polymer network (for such networks also the term 'liquid crystalline polymer networks', LCP's, is being used). In turn, this nematic prepolymer-based anisotropic network can act as an orienting layer for liquid crystals.

This procedure uses two layers, the LPP and the nematic prepolymer-based anisotropic network, thus doubling the overall thickness of the orientation layer. Furthermore, if the nematic prepolymer layer is of the order of or thinner than the extrapolation length [see e.g. P. G. de Gennes and J. Prost, "The Physics of Liquid Crystals", 2$^{nd}$ edition, Clarendon Press, Oxford 1993, p. 196], the liquid crystal can no longer average or smooth over microscopic irregularities in the orienting layer. Precise numbers for this extrapolation length are not known, but typical values quoted are larger than 100 nm. Very thin nematic prepolymer layers—and, therefore, also the nematic prepolymer-based anisotropic networks made from those prepolymer layers—will not orient homogeneously but will reflect the microscopic irregularities of the underlying LPP layer.

In total contrast to the foregoing, and in opposition to received teaching, the present invention consists in a component comprising a liquid crystal material in contact with an orientation layer, the orientation layer having a first layer of a linearly photopolymerised polymer and a second layer of a nematic prepolymer-based anisotropic network, characterised in that the overall thickness of the two layers together does not exceed 40 nanometers.

Preferably each of the layers is less than 20 nm thick.

Especially advantageous for many cases is an overall layer thickness of less than 20 nm, and most preferably the overall layer thickness is less than 10 nm.

Such orientation layers are surprisingly especially suited for use with ferroelectric liquid crystal materials, such as for Deformed Helix Ferroelectric or Short-pitch Bistable Ferroelectric or Alternating Polarisation Domain or Surface Stabilised Ferroelectric or antiferroelectric liquid crystal displays, as well as for electroclinic liquid crystal displays.

The orientation layer may be patterned as for multi-domain pixel operation, in other words the orientation may vary locally.

The nematic prepolymer-based anisotropic network is preferably photopolymerised, however, it is also possible to use a different polymerisation method, such as e.g. thermal polymerisation.

With orientation layers according to the invention advantageous homogeneous alignments and textures of liquid crystal material and high contrast ratios are achievable, which often are superior to an orientation layer consisting of LPP only.

Furthermore, the two-layer technique allows to control the tilt angle of the second layer, the nematic prepolymer-based anisotropic network, and thus also the tilt angle of the ferroelectric liquid crystal in a ferroelectric liquid crystal display. This can be very important to control the formation of chevron structures in smectic ferroelectric liquid crystal layers.

The invention will now be described by way of example with reference to the accompanying drawings, in which FIG. 1 shows a liquid crystal cell embodying orientation layers according to the invention.

The liquid crystal cell shown schematically in FIG. 1, which also corresponds to our example test-cells, consists of two identical substrate assemblies (11, 13, 15, 17) and (12, 14, 16, 18) kept apart by spacers 19 and glued together (not shown) outside the operative area. The substrates are glass plates (11,12) coated with conductive indium-tin-oxide (ITO) electrodes (13, 14), linearly photopolymerised polymer (LPP) layers (15, 16) and liquid crystalline polymer network (LCP) layers (17,18). The cell gap is 1.6 µm.

The LPP compound used is the photoaligning material A, diluted to 0.7% polymer in cyclopentanone.

Photopolymer A:

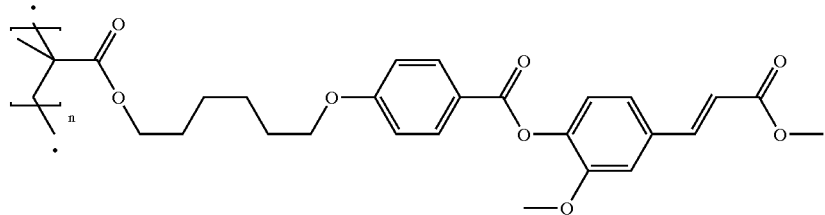

The ITO-coated substrates are spin-coated with this solution (30 sec at 5000 rpm). After drying, the samples are cured for 15 min at 150° C. and then illuminated for 3 min by polarised light from a high pressure Hg arc-lamp with filters (Schott UG11 and WG 295) to select the spectral range of 300 . . . 330 nm. The resulting thickness of the layer was determined as 9 nm, measured with a surface profiler (Alpha-Step 500 from Tencore).

The nematic liquid crystal prepolymer used is a mixture $M_{LCP}$ that comprises the following liquid crystalline diacrylate monomers:

Mon1:

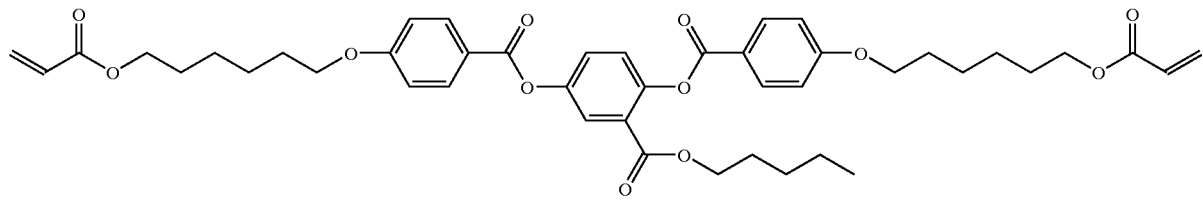

Mon2:

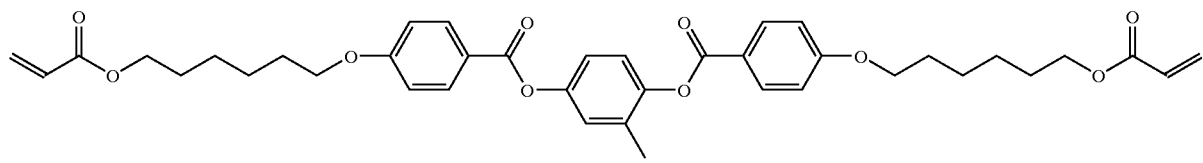

Mon3:

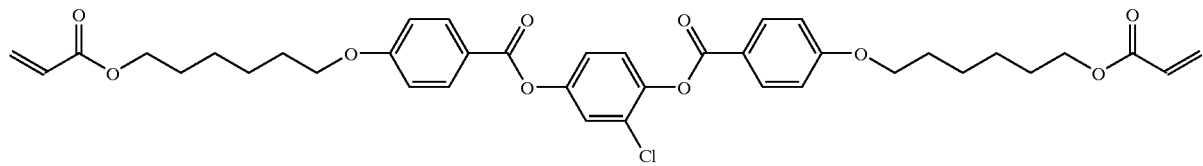

In addition to the diacrylate monomers, photoinitiator IRGACURE 369 from Ciba SC as well as BHT (2,6-di-tert-butyl-4-methylphenol/"butyl hydroxytoluene") which serves as an inhibitor, are added to the mixture. Thus the composition of mixture $M_{LCP}$ is as follows:

| | |
|---|---|
| Mon1 | 77 wt % |
| Mon2 | 14.5 wt % |
| Mon3 | 4.7 wt % |
| Irgacure 369 | 1.9 wt % |
| BHT | 1.9 wt % |

The mixture $M_{LCP}$ is diluted to 0.7% polymer in anisole. The said LPP-coated substrates are spin-coated with this solution (30 sec at 5000 rpm). After drying, the samples are illuminated in a nitrogen atmosphere for 3 min by light from a 150 W Hg arc-lamp with no additional filters. The thus produced hybrid layer of LPP and LCP had an overall thickness of 18 nanometers.

The cells are filled with a ferroelectric liquid crystalline material, mixture SC980110 (see table I), at 110° C. by capillary action. The orientation of the ferroelectric liquid crystal layer 20 is optimised by the following forming procedure: the cell is kept for about 2 minutes at a temperature about 1° C. below the nematic-Sc* transition temperature with a 3 V (amplitude), 800 Hz square wave voltage applied and then cooled to room temperature, keeping the voltage on. During this curing process, most dislocations disappear, and a high contrast ratio of 130:1 is achieved.

This contrast ratio is the ratio of the light transmission for the sample oriented for maximum and for minimum transmission, respectively. These light transmissions are measured in a polarising microscope with a 4/0.1 objective lens in a measuring area with an effective diameter of 0.47 mm.

TABLE I

Composition of SC980110

| Structure | weight-% |
|---|---|
| | 5.9 |
| | 1.1 |
| | 1.1 |
| | 2.2 |
| | 2.5 |
| | 25.0 |
| | 12.0 |

TABLE I-continued

Composition of SC980110

| Structure | weight-% |
|---|---|
| [chemical structure: alkyl-pyridine-phenyl-O-C(=O)-alkyl] | 4.7 |
| [chemical structure: alkyl-pyridine-phenyl-O-alkenyl] | 4.7 |
| [chemical structure: alkyl-pyridine-phenyl-O-alkenyl] | 4.7 |
| [chemical structure: alkenyl-O-pyrimidine-phenyl-alkyl] | 9.4 |
| [chemical structure: alkyl-pyrimidine-phenyl-O-alkyl] | 14.0 |
| [chemical structure: alkyl-pyrimidine-phenyl-O-alkyl] | 14.0 |

What is claimed is:

1. An orientation layer for a liquid crystal material comprising
   a first layer of a linearly photopolymerised polymer and
   a second layer of a nematic prepolymer-based anisotropic network,
   wherein the combined thickness of said first layer and said second layer is less than or equal to 40 nanometers.

2. The orientation layer according to claim 1, wherein said first layer is less than 20 nanometers thick and said second layer is less than 20 nanometers thick.

3. The orientation layer according to claim 1, wherein the combined thickness of said first layer and said second layer is less than 20 nanometers.

4. The orientation layer according to claim 1, wherein the combined thickness of said first layer and said second layer is less than 10 nanometers.

5. The orientation layer according to claim 1, wherein the orientation varies locally.

6. The orientation layer according to claim 1, wherein the second layer is in contact with a liquid crystal material.

7. The orientation layer according to claim 6, wherein the liquid crystal material is ferroelectric.

8. A liquid crystal cell comprising an orientation layer according to claim 1.

9. A liquid crystal cell according to claim 8, wherein said liquid crystal cell is of the Deformed Helix Ferroelectric (DHF) type.

10. A liquid crystal cell according to claim 8, wherein said liquid crystal cell is of the Short-pitch Bistable Ferroelectric (SBF) type.

11. A liquid crystal cell according to claim 8, wherein said liquid crystal cell is of the Alternating Polarisation Domain (APD) type.

12. A liquid crystal cell according to claim 8, wherein said liquid crystal cell is of the Surface Stabilised Ferroelectric (SSF) type.

13. A liquid crystal cell according to claim 8, wherein said liquid crystal cell is of the antiferroelectric type.

14. A liquid crystal cell according to claim 8, wherein said liquid crystal cell is of the electroclinic type.

* * * * *